United States Patent
Yu et al.

(10) Patent No.: US 12,057,560 B2
(45) Date of Patent: Aug. 6, 2024

(54) PICKLING-FREE RECOVERY PROCESS OF BATTERY ELECTRODE SHEET

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Yingsheng Zhong, Guangdong (CN); Yinghao Xie, Guangdong (CN); Xuemei Zhang, Guangdong (CN); Changdong Li, Guangdong (CN)

(73) Assignees: Guangdong Brunp Recycling Technology Co., Ltd., Guangdong (CN); Hunan Brunp Recycling Technology Co., Ltd., Hunan (CN); Hunan Brunp EV Recycling Co., Ltd., Hunan (CN)

( * ) Notice: Subject to any disclaimer, the term of this patent is extended or adjusted under 35 U.S.C. 154(b) by 0 days.

(21) Appl. No.: 18/556,331

(22) PCT Filed: Jun. 6, 2022

(86) PCT No.: PCT/CN2022/097186
§ 371 (c)(1),
(2) Date: Oct. 19, 2023

(87) PCT Pub. No.: WO2023/000850
PCT Pub. Date: Jan. 26, 2023

(65) Prior Publication Data
US 2024/0204278 A1    Jun. 20, 2024

(30) Foreign Application Priority Data
Jul. 23, 2021  (CN) .......................... 202110834780.X

(51) Int. Cl.
H01M 10/54    (2006.01)
H01M 4/04     (2006.01)

(52) U.S. Cl.
CPC ......... H01M 10/54 (2013.01); H01M 4/0416 (2013.01); H01M 4/0471 (2013.01)

(58) Field of Classification Search
CPC ...................................................... H01M 10/54
See application file for complete search history.

(56) References Cited

FOREIGN PATENT DOCUMENTS

| CN | 202585684 U | 12/2012 |
|---|---|---|
| CN | 107171036 A | 9/2017 |

(Continued)

OTHER PUBLICATIONS

International Search Report dated Aug. 18, 2022 from corresponding PCT Application No. PCT/CN2022/097186.

*Primary Examiner* — Brian R Ohara
(74) *Attorney, Agent, or Firm* — ArentFox Schiff LLP

(57) ABSTRACT

Disclosed in the present invention is a recovery process for a waste battery electrode sheet, the method comprising the following steps: subjecting a waste battery electrode sheet to shearing, drying and cold treatment, and then rolling and screening same to obtain a first positive electrode material and a first waste electrode sheet; subjecting the first waste electrode sheet to shearing, drying and cold treatment, and then rolling and screening same to obtain a second positive electrode material and a second waste electrode sheet; and roasting the first positive electrode material and the second positive electrode material to obtain a positive electrode powder. In the present invention, the aluminum content in the positive electrode material is reduced by means of step-by-step shearing, and the adhesion performance of a waste positive electrode plate binder is then reduced by means of vacuum freeze-drying and spraying with a quick- (Continued)

cooling agent. The aluminum foil of the positive electrode material does not easily break when being broken after vacuum freeze-drying, and the morphology and output of the aluminum foil after primary shearing and secondary shearing are basically unchanged.

9 Claims, 1 Drawing Sheet

(56) References Cited

FOREIGN PATENT DOCUMENTS

| | | | |
|---|---|---|---|
| CN | 108172926 A | | 6/2018 |
| CN | 108281729 A | | 7/2018 |
| CN | 207572493 U | | 7/2018 |
| CN | 108539309 A | | 9/2018 |
| CN | 108933307 A | | 12/2018 |
| CN | 109687051 A | * | 4/2019 |
| CN | 109818097 A | | 5/2019 |
| CN | 110120560 A | | 8/2019 |
| CN | 111135939 A | | 5/2020 |
| CN | 111960480 A | | 11/2020 |
| CN | 113690501 A | | 11/2021 |
| JP | 2012153929 A | | 8/2012 |

* cited by examiner

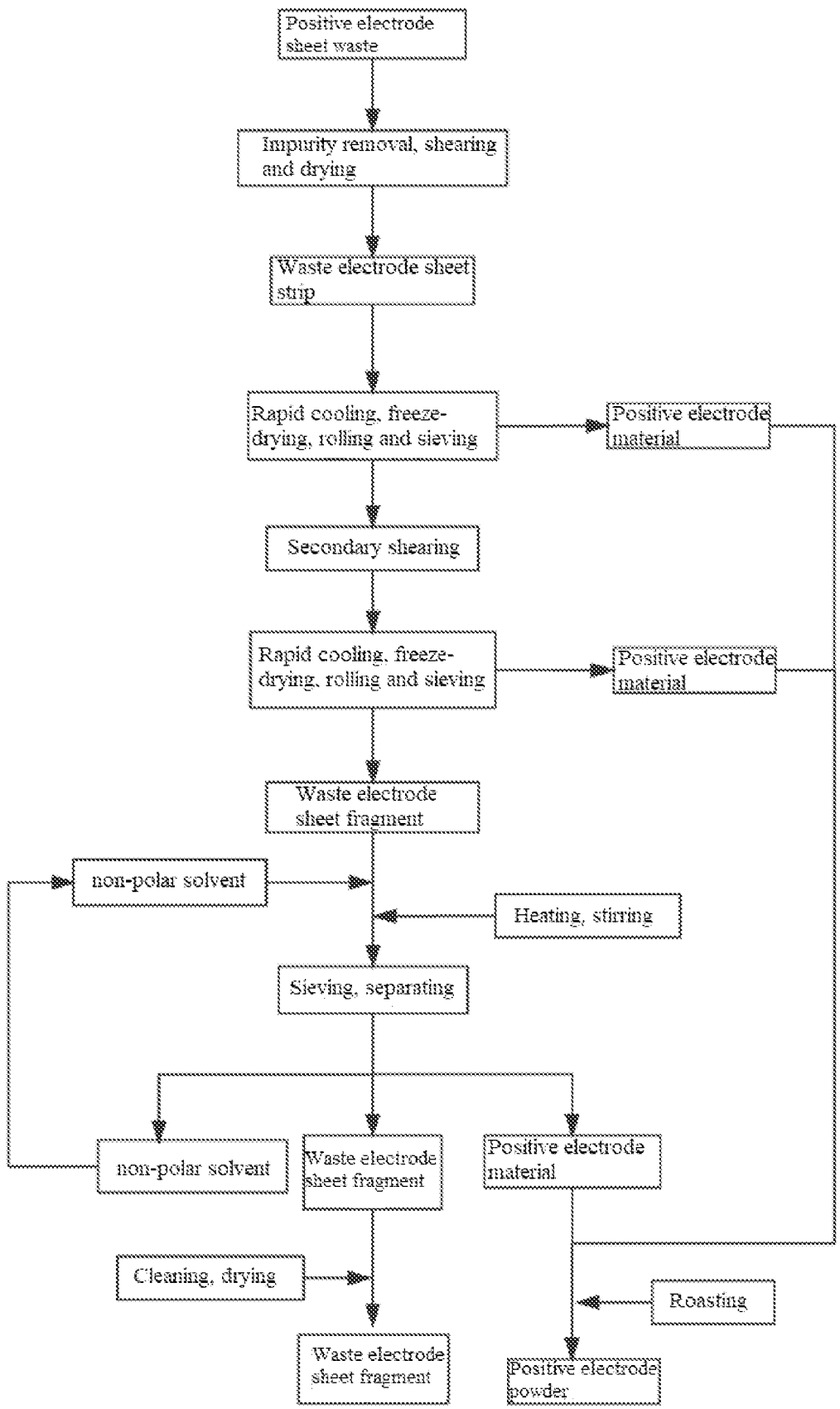

PICKLING-FREE RECOVERY PROCESS OF BATTERY ELECTRODE SHEET

CROSS REFERENCE TO RELATED APPLICATION(S)

This application is a national stage application filed under 35 U.S.C. 371 based on International Patent Application No. PCT/CN2022/097186, filed on Jun. 6, 2022, which claims priority to Chinese Patent Application No. 202110834780.X filed with the China National Intellectual Property Administration (CNIPA) on Jul. 23, 2021, the disclosures of both of which are incorporated herein by reference in their entireties.

TECHNICAL FIELD

The present disclosure relates to the technical field of battery recycling, and specifically relates to a recycling process for battery electrode sheets without pickling.

BACKGROUND

The new energy electric vehicle industry of China develops rapidly, which has promoted the rapid growth of electric vehicle sales, and the demand for power batteries will continue to increase. However, the production of power batteries brings a lot of positive electrode sheet waste.

The current production of positive electrode materials by recovering positive electrode sheet waste materials mainly includes two steps: 1, waste positive electrode sheets treatment: a series of operations such as coarse crushing, fine pulverization, pyrolysis, and sieving are performed on the waste electrode sheets to obtain positive electrode particles; 2, positive electrode material preparation: the positive electrode particles are subjected to acid leaching, impurity removal, extraction, and synthesis to obtain positive electrode materials.

In the waste positive electrode sheets treatment, pickling pretreatment is often carried out to strengthen the separation of the positive electrode material and the aluminum foil, and to dissolve part of aluminum on the waste positive electrode sheet, which will help to separate the positive electrode material from the aluminum foil and improve the recycling efficiency of the positive electrode material, and in addition, the aluminum foil will also be easy to recovery. However, after pickling: 1, the water and acid remaining in the recycled aluminum foil will generate flammable and explosive hydrogen with aluminum, which is very dangerous; 2, the acid-dissolved aluminum is mixed with particles such as the positive electrode active material and the binder, and then the mixture enters the next acid leaching process, increasing the impurity content, thus improving the difficulty of the subsequent impurity removal process; 3, after the acid treatment, the aluminum foil is thinner and more brittle, and voids on the waste positive electrode sheets increase, and the crushing will increase the amount of fine particles of aluminum and aluminum powder, which cannot be intercepted by sieving, and thus are incorporated into the waste positive electrode particles, thereby further increasing the aluminum content, increasing the difficulty of the subsequent leaching and impurity removal process, and increasing the corresponding cost. Especially for the point 3 above, in most of the current technologies for recycling and treating the waste positive electrodes of batteries, crushing and sieving are the two necessary steps, which will inevitably bring the coarse particles of aluminum and aluminum powder into the positive electrode active material, and aluminium must be removed in the subsequent impurity removal process.

SUMMARY

The present disclosure is to solve at least one of the above technical problems existing in the prior art. For this reason, the present disclosure provides a recycling process for a battery electrode sheet without pickling. The process does not undergo pickling, reduces coarse particles of aluminum and aluminum powder incorporated in the positive electrode particles, improves the separation efficiency of a positive electrode material and an aluminum foil, and reduces the risk in the recycling process of the positive electrode material.

To achieve the object, the present disclosure adopts the following technical solutions.

A recycling process for a waste battery electrode sheet, comprising the following steps:

(1) shearing, drying, and cold treating the waste battery electrode sheet, and then rolling and sieving to obtain a first positive electrode material and a first waste electrode sheet;

(2) shearing, drying, and cold treating the first waste electrode sheet, and then rolling and sieving to obtain a second positive electrode material and a second waste electrode sheet; and (3) roasting the first positive electrode material and the second positive electrode material to obtain a positive electrode powder.

Preferably, step (1) further includes: adding the first waste electrode sheet into a non-polar solvent for soaking to obtain a first positive electrode dispersion and a current collector.

Preferably, step (2) further includes: adding the second waste electrode sheet into a non-polar solvent for soaking to obtain a second positive electrode dispersion and a current collector.

Further preferably, the first positive electrode dispersion and the second positive electrode dispersion are subjected to solvent removing to obtain a third positive electrode material.

Preferably, in step (1), the shearing includes shearing the waste battery electrode sheet into waste electrode sheet strips with a width of 2 cm to 4 cm and a length of 4 cm to 10 cm.

Because the smaller the waste positive electrode sheet is crushed, the aluminum fragments and aluminum powder in the corresponding positive electrode material increase, a method of stepwise shearing and stepwise recycling is used in the present disclosure, so that the above waste positive electrode sheet is first sheared into strips and then sheared into fragments. A primary shearing produces the least aluminum fragments, and most of the positive electrode materials are recycled synchronously, so the positive electrode material recycled by the primary shearing has the least aluminum content; after a secondary shearing, the aluminum fragments and aluminum powder in the recycled positive electrode materials increase. After two-stage shearing, most of the positive electrode materials have been recycled.

In the present disclosure, the waste positive electrode sheet is sheared into strips, while controlling the size of the waste positive electrode sheet, which will facilitate the shedding of the positive electrode material, reduce the entry of aluminum fragments into the positive electrode particles, and improve the separation efficiency. The main reasons of which are that: the fragments of the waste positive electrode sheet are too small, and it is easier to wrap the positive electrode material after rolling, tearing, vibration, high temperature, etc.; the side length of the waste positive electrode sheet is elongated by shearing with a shearing machine, which will reduce the number of sides of the waste electrode sheet, and thus the number of the sides of the waste electrode sheet that are rolled in, thereby indirectly reducing the positive electrode material rolled in the sides of the waste electrode sheet; if the side length is shortened, the number of sides will increase, and the edges of the waste electrode sheets with the adjacent multiple sides are easier to be rolled in and wrap more positive electrode materials, and the positive electrode materials wrapped by the rolled waste positive electrode sheets need to be crushed again and then subjected to sieving, whereas multiple crushing is the main reason for increasing the content of aluminum fragments in the positive electrode material.

Preferably, in step (1) to step (2), the cold treating includes: freeze-drying the waste battery electrode sheet; more preferably, further includes: carrying out a surface rapid cooling treatment on the waste battery electrode sheet after the freeze-drying.

Further preferably, the freeze-drying is performed at −140° C. to −50° C. for 5 min to 15 min.

Further preferably, a rapid cooling agent used for the surface rapid cooling treatment is dry ice.

Preferably, the rapid cooling has an average temperature drop rate of 5° C./min to 25° C./min.

Preferably, in the step (1), the rolling is performed at −80° C. to −50° C.

Further preferably, the non-polar solvent is at least one of diethylacetamide (DEAC), trimethyl phosphate (TMP), or triethyl phosphate (TEP).

Freeze-drying, crushing, and sieving have obvious selective crushing compared to crushing and sieving at normal temperature. At normal temperature, the adhesive performance of the binder of the waste positive electrode sheet is very strong, and the positive electrode material is difficult to fall off from the aluminum foil, thus the aluminum foil is easily crushed to enter the positive electrode material, which is not conducive to further sieving. After vacuum freeze-drying, the aluminum foil of the positive electrode material is not easy to be crushed during crushing, and the morphology output of the aluminum foil after primary shearing and secondary shearing are basically unchanged. The binder in the positive electrode material is changed into a crystalline state at a low temperature, the binding ability of the binder is weakened or even not, and the brittleness of the binder increases. Compared with the normal temperature, the aluminum foil has an enhanced ductility at an ultra-low temperature, and has an enhanced rolling resistance and impact resistance abilities. The positive electrode material is easily dispersed from the aluminum foil under the action of rolling, impact, vibration and other external forces. The crushing at the low temperature has a better shedding effect of the electrode material particles and a less aluminum content than the crushing at the normal temperature.

Preferably, in step (3), the roasting is performed at 600° C. to 1000° C. for 30 min to 90 min.

Compared with the prior art, the present disclosure has beneficial effects as follows.

i. The present disclosure performs a cold treatment on the waste battery electrode sheets to reduce the adhesive performance of the binder of the waste positive electrode sheet, and the aluminum foil has an enhanced ductility at a low temperature, and has an enhanced rolling resistance and impact resistance abilities. The positive electrode material is easily dispersed from the aluminum foil under the action of rolling, impact, vibration and other external forces, and the aluminum foil is not easily crushed after the cold treatment, which reduces the aluminum content in the positive electrode material.

ii. The present disclosure only uses a physical method to separate the aluminum foil from the positive electrode material, and does not use pickling and high-temperature pyrolysis to strengthen the separation of the positive electrode material and the aluminum foil. It not only avoids incorporating aluminum into the positive electrode material by pickling, but also avoids the high temperature (>660° C.) melting the aluminum foil and wrap the positive electrode material, which is not conducive to sieving the positive electrode material and the aluminum foil. Meanwhile, the time for two vacuum freeze-drying treatments only needs 10 min to 30 min, and the time cost of the treatment is very low. The two shearing treatments are different from the crushing treatment. The shearing treatment method is milder and produces few aluminum fragments; the conventional method requires multiple crushing, which will also bring a large amount of aluminum fragments into the positive electrode material.

iii. In the present disclosure, the non-polar solvent is added to dissolve the remaining binder, and the positive electrode material is washed off at the same time, thereby improving the separation rate of the positive electrode material and the aluminum foil; a small amount of non-polar solvent is used to dissolve the remaining binder while washing off the positive electrode material, the amount of the non-polar solvent is reduced, and only the last small part (<5%) of the positive electrode material needs to be separated. Therefore, there are few non-polar solvent used, and the separation cost is correspondingly reduced, and in addition, the non-polar solvent will be recycled after separating the positive electrode material.

BRIEF DESCRIPTION OF THE DRAWINGS

The present disclosure will be further described in details with the drawings and examples, wherein:

FIG. 1 is a process flow chart of Example 1 in the present disclosure.

DETAILED DESCRIPTION OF THE EMBODIMENTS

Hereinafter, the concept of the present disclosure and the technical effects produced will be described clearly and completely with reference to the examples, so as to fully understand the purpose, features and effects of the present disclosure. It is apparent that the described examples are only a part of the examples of the present disclosure, and not all of the examples, and other examples obtained by those skilled in the art based on the examples of the present disclosure without creative efforts fall within the protection scope of the present disclosure.

Example 1

A recycling process for a waste battery electrode sheet of this example includes the following specific steps:

a. pre-treating waste electrode sheets: surface impurities were removed from 35.69 kg of waste electrode sheets, and a primary shearing was performed on the waste electrode sheets by a shearing machine to obtain waste electrode sheet strips with a width of 2 cm to 4 cm and a length of 4 cm to 10 cm;

b. treating waste electrode sheet strips: waste electrode sheet strips were moved to a heating furnace with a temperature of 105° C. to be dried for 20 min, then cooled to room temperature after being dried, and moved to a freezer to be freeze-dried at −95° C., and moved out after being freeze-dried, and dry ice was sprayed on the surface of waste electrode sheet strips for rapid cooling to prevent the surface of the waste electrode sheet strips from heating up too fast, then the waste electrode sheet strips were quickly rolled, vibratory sieved to obtain a positive electrode material and waste electrode sheet strips;

c. secondary shearing: the waste electrode sheet strips were sheared by a shearing machine to obtain waste electrode sheet fragments, then the waste electrode sheet fragments were moved to a freezer to be freeze-dried at −92° C. for 10 min, and moved out after being freeze-dried, and dry ice was sprayed on the surface of waste electrode sheet fragments for rapid cooling to prevent the surface of the waste electrode sheet fragments from heating up too fast, then the waste electrode sheet fragments were quickly rolled, vibratory sieved to obtain the positive electrode material and waste electrode sheet fragments;

d. cleaning waste electrode sheet fragments: the waste electrode sheet fragments were placed in a boiler with a temperature of 73° C., and trimethyl phosphate was added to the boiler, then stirred for 25 min, and separated to obtain the waste electrode sheet fragments, the positive electrode material, and a non-polar solvent; the obtained waste electrode sheet fragments can be cleaned with an aqueous solution containing 18% ethanol;

e. roasting: the positive electrode materials recycled in steps (2), (3) and (4) were placed in a heating furnace with a temperature of 710° C. and introduced with air to be roasted for 65 min, to remove the binder in the positive electrode materials, then, 27.51 kg of positive electrode powder was obtained, and the waste electrode sheets were recycled after drying.

FIG. 1 is a process flow chart of Example 1 in the present disclosure. It can be seen from FIG. 1 that, firstly, the waste electrode sheet is sheared into waste electrode sheet strips; the waste pole piece strips are dried and freeze-dried at ultra-low temperature; then the surface of the waste electrode sheet strips is rapidly cooled; and the waste pole piece strips are rolled, vibratory sieved; the binder in the waste electrode sheet fragments is dissolved and cleaned; and finally the positive electrode powder is obtained by roasting.

Example 2

A recycling process for a waste battery electrode sheet of this example includes the following specific steps:

a. pre-treating waste electrode sheets: surface impurities were removed from 35.80 kg of waste electrode sheets, and a primary shearing was performed on the waste electrode sheets by a shearing machine to obtain waste electrode sheet strips with a width of 2 cm to 4 cm and a length of 4 cm to 10 cm;

b. treating waste electrode sheet strips: waste electrode sheet strips were moved to a heating furnace with a temperature of 105° C. to be dried for 20 min, then cooled to room temperature after being dried, and moved to a freezer to be freeze-dried at −89° C., and moved out after being freeze-dried, and dry ice was sprayed on the surface of waste electrode sheet strips for rapid cooling to prevent the surface of the waste electrode sheet strips from heating up too fast, then the waste electrode sheet strips were quickly rolled, vibratory sieved to obtain a positive electrode material and waste electrode sheet strips;

c. secondary shearing: the waste electrode sheet strips were sheared by a shearing machine to obtain waste electrode sheet fragments, then the waste electrode sheet fragments were moved to a freezer to be freeze-dried at −87° C. for 10 min, and moved out after being freeze-dried, and dry ice was sprayed on the surface of waste electrode sheet fragments for rapid cooling to prevent the surface of the waste electrode sheet fragments from heating up too fast, then the waste electrode sheet fragments were quickly rolled, vibratory sieved to obtain the positive electrode material and waste electrode sheet fragments;

d. cleaning waste electrode sheet fragments: the waste electrode sheet fragments were placed in a boiler with a temperature of 64° C., and trimethyl phosphate was added to the boiler, then stirred for 30 min, and separated to obtain the waste electrode sheet fragments, the positive electrode material, and a non-polar solvent; the obtained waste electrode sheet fragments can be cleaned with an aqueous solution containing 18% ethanol; and e. roasting: the positive electrode materials recycled in steps (2), (3) and (4) were placed in a heating furnace with a temperature of 845° C. and introduced with air to be roasted for 57 min, to remove the binder in the positive electrode materials, then, 28.43 kg of positive electrode powder was obtained, and the waste electrode sheets were recycled after drying.

Example 3

A recycling process for a waste battery electrode sheet of this example includes the following specific steps:

a. pre-treating waste electrode sheets: surface impurities were removed from 38.31 kg of waste electrode sheets, and a primary shearing was performed on the waste electrode sheets by a shearing machine to obtain waste electrode sheet strips with a width of 2 cm to 4 cm and a length of 4 cm to 10 cm;

b. treating waste electrode sheet strips: waste electrode sheet strips were moved to a heating furnace with a temperature of 105° C. to be dried for 20 min; then cooled to room temperature after being dried, and moved to a freezer to be freeze-dried at −75° C., and moved out after being freeze-dried, and dry ice was sprayed on the surface of waste electrode sheet strips for rapid cooling to prevent the surface of the waste electrode sheet strips from heating up too fast, then the waste electrode sheet strips were quickly rolled, vibratory sieved to obtain a positive electrode material and waste electrode sheet strips;

c. secondary shearing: the waste electrode sheet strips were sheared by a shearing machine to obtain waste electrode sheet fragments, then the waste electrode sheet fragments were moved to a freezer to be freeze-dried at −78° C. for 10 min, and moved out after being freeze-dried, and dry ice was sprayed on the surface of waste electrode sheet fragments for rapid cooling to prevent the surface of the waste electrode sheet fragments from heating up too fast, then the waste electrode sheet fragments were quickly rolled, vibratory sieved to obtain the positive electrode material and waste electrode sheet fragments;
d. cleaning waste electrode sheet fragments: the waste electrode sheet fragments were placed in a boiler with a temperature of 58° C., and diethylacetamide was added to the boiler, then stirred for 27 min, and separated to obtain the waste electrode sheet fragments, the positive electrode material, and a non-polar solvent; the obtained waste electrode sheet fragments can be cleaned with an aqueous solution containing 18% ethanol; and
e. roasting: the positive electrode materials recycled in steps (2), (3) and (4) were placed in a heating furnace with a temperature of 800° C. and introduced with air to be roasted for 86 min, to remove the binder in the positive electrode materials, then, 29.03 kg of positive electrode powder was obtained, and the waste electrode sheets were recycled after drying.

Example 4

A recycling process for a waste battery electrode sheet of this example includes the following specific steps:
a. pre-treating waste electrode sheets: surface impurities were removed from 34.17 kg of waste electrode sheets, and a primary shearing was performed on the waste electrode sheets by a shearing machine to obtain waste electrode sheet strips with a width of 2 cm to 4 cm and a length of 4 cm to 10 cm;
b. treating waste electrode sheet strips: waste electrode sheet strips were moved to a heating furnace with a temperature of 105° C. to be dried for 20 min, then cooled to room temperature after being dried, and moved to a freezer to be freeze-dried at −94° C., and moved out after being freeze-dried, and dry ice was sprayed on the surface of waste electrode sheet strips for rapid cooling to prevent the surface of the waste electrode sheet strips from heating up too fast, then the waste electrode sheet strips were quickly rolled, vibratory sieved to obtain a positive electrode material and waste electrode sheet strips;
c. secondary shearing: the waste electrode sheet strips were sheared by a shearing machine to obtain waste electrode sheet fragments, then the waste electrode sheet fragments were moved to a freezer to be freeze-dried at −90° C. for 10 min, and moved out after being freeze-dried, and dry ice was sprayed on the surface of waste electrode sheet fragments for rapid cooling to prevent the surface of the waste electrode sheet fragments from heating up too fast, then the waste electrode sheet fragments were quickly rolled, vibratory sieved to obtain the positive electrode material and waste electrode sheet fragments;
d. cleaning waste electrode sheet fragments: the waste electrode sheet fragments were placed in a boiler with a temperature of 68° C., and trimethyl phosphate was added to the boiler, then stirred for 24 min, and separated to obtain the waste electrode sheet fragments, the positive electrode material, and a non-polar solvent; the obtained waste electrode sheet fragments can be cleaned with an aqueous solution containing 18% ethanol; and
e. roasting: the positive electrode material recycled in steps (2), (3) and (4) were placed in a heating furnace with a temperature of 800° C. and introduced with air to be roasted for 60 min, to remove the binder in the positive electrode materials, then, 26.45 kg of positive electrode powder was obtained, and the waste electrode sheets were recycled after drying.

Comparative Example 1

A recycling process for a waste battery electrode sheet of this comparative example includes the following specific steps:
a. pre-treating waste electrode sheets: surface impurities were removed from 34.98 kg of recycled waste electrode sheets, and the waste electrode sheets were sheared by a shearing machine to obtain waste electrode sheet strips with a width of 2 cm to 4 cm and a length of 4 cm to 10 cm, then, the waste electrode sheet strips were subjected to leaching with 0.03 mol/L of dilute sulfuric acid for 18 min and washing twice with water, and then dried in a heating furnace;
b. treating waste electrode sheets: waste electrode sheet strips were moved to a heating furnace with a temperature of 105° C. to be dried for 20 min; after drying, the waste electrode sheets were crushed by a crusher to obtain 34.83 kg of waste electrode sheet fragments; then, aluminum and a positive electrode material were sieved by a vibrating sieve, and non-sieved materials were crushed by the crusher and sieved again to separate aluminum and the positive electrode material; and
c. roasting: the positive electrode material was roasted stably for 70 min in a heating furnace introduced with air, and the heating furnace was controlled at 535° C.; the binder in the positive electrode material was removed by roasting, then about 27.17 kg of positive electrode powder was obtained, and the waste electrode sheets were recycled after drying.

Comparative Example 2

A recycling process for a waste battery electrode sheet of this comparative example includes the following specific steps:
a. pre-treating waste electrode sheets: surface impurities were removed from 32.53 kg of recycled waste electrode sheets, and the waste electrode sheet strips were subjected to leaching with 0.05 mol/L of dilute sulfuric acid for 13 min and washing thrice with water, and then dried in a heating furnace;
b. treating waste electrode sheets: waste electrode sheet strips were moved to a heating furnace with a temperature of 100° C. to be dried for 20 min; after drying, the waste electrode sheets were crushed by a crusher to obtain 31.16 kg of waste electrode sheet fragments; then, aluminum and a positive electrode material were sieved by a vibrating sieve, and non-sieved materials were crushed by the crusher and sieved again to separate aluminum and the positive electrode material; and
c. roasting: the positive electrode material was roasted stably for 61 min in a heating furnace introduced with air, and the heating furnace was controlled at 535° C.; the binder in the positive electrode material was removed by roasting, then about 25.25 kg of positive electrode powder was obtained, and the waste electrode sheets were recycled after drying.

Comparative Example 3

A recycling process for a waste battery electrode sheet of this comparative example includes the following specific steps:

a. pre-treating waste electrode sheets: surface impurities were removed from 32.12 kg of recycled waste electrode sheets, and the waste electrode sheet strips were subjected to leaching with 0.10 mol/L of dilute sulfuric acid for 4 min and washing twice with water, and then dried in a heating furnace;
b. treating waste electrode sheets: waste electrode sheet strips were moved to a heating furnace with a temperature of 105° C. to be dried for 20 min; after drying, the waste electrode sheets were crushed by a crusher to obtain 27.64 kg of waste electrode sheet fragments; then, aluminum and a positive electrode material were sieved by a vibrating sieve, and non-sieved materials were crushed by the crusher and sieved again to separate aluminum and the positive electrode material; and
c. roasting: the positive electrode material was roasted stably for 78 min in a heating furnace introduced with air, and the heating furnace was controlled at 535° C.; the binder in the positive electrode material was removed by roasting, then about 24.06 kg of positive electrode powder was obtained, and the waste electrode sheets were recycled after drying.

TABLE 1

Aluminum content in Examples 1 to 4 and Comparative Examples 1 to 3

| Groups | Mass of waste electrode sheet (kg) | Mass of positive electrode powder (kg) | Aluminum content in positive electrode powder (kg) | Aluminum content in positive electrode powder (%) |
|---|---|---|---|---|
| Example 1 | 35.69 | 27.51 | 0.041 | 0.15% |
| Example 2 | 25.80 | 28.43 | 0.038 | 0.13% |
| Example 3 | 38.31 | 29.03 | 0.023 | 0.08% |
| Example 4 | 34.17 | 26.45 | 0.029 | 0.11% |
| Comparative Example 1 | 34.98 | 27.17 | 1.38 | 5.08% |
| Comparative Example 2 | 32.53 | 25.25 | 1.131 | 4.48% |
| Comparative Example 3 | 32.12 | 24.06 | 1.195 | 4.97% |

Aluminum in the positive electrode powder was measured by a spectrophotometric method, and the aluminum content in the positive electrode powder (%)=the aluminum content in the positive electrode powder/the mass of the positive electrode powder.

It can be seen from the Table 1 that, the aluminum contents in the treated positive electrode powders in Examples 1 to 4 are very low, which are 0.15%, 0.13%, 0.08% and 0.11%, respectively; while the aluminum contents in the positive electrode powders in Comparative Examples 1 to 3 after been pickled, crushed, sieved, and roasted are 5.08%, 4.48%, and 4.97%, which are significantly higher.

The embodiments of the present disclosure are described in detail above, but the present disclosure is not limited to the above embodiments, and various changes can be made without departing from the purpose of the present disclosure within the scope of knowledge possessed by those of ordinary skill in the art. In addition, embodiments in the present disclosure and features in the embodiments can be combined with each other under the premise of no conflict.

What is claimed is:

1. A recycling process for a waste battery electrode sheet, comprising the following steps:
   (1) shearing, drying, and cold treating the waste battery electrode sheet, and then rolling and sieving to obtain a first positive electrode material and a first waste electrode sheet;
   (2) shearing, drying, and cold treating the first waste electrode sheet, and then rolling and sieving to obtain a second positive electrode material and a second waste electrode sheet; and
   (3) roasting the first positive electrode material and the second positive electrode material to obtain a positive electrode powder;
   wherein, in step (1), the shearing comprises shearing the waste battery electrode sheet into waste electrode sheet strips with a width of 2 cm to 4 cm and a length of 4 cm to 10 cm.

2. The recycling process according to claim 1, wherein, step (1) further comprises: adding the first waste electrode sheet into a non-polar solvent for soaking to obtain a first positive electrode dispersion and a current collector; and step (2) further comprises: adding the second waste electrode sheet into a non-polar solvent for soaking to obtain a second positive electrode dispersion and a current collector.

3. The recycling process according to claim 2, wherein, the first positive electrode dispersion and the second positive electrode dispersion are subjected to solvent removing to obtain a third positive electrode material.

4. The recycling process according to claim 1, wherein, in step (1) and step (2), the cold treating comprises: freeze-drying the waste battery electrode sheet; preferably, further comprises: performing a surface rapid cooling treatment on the waste battery electrode sheet after the freeze-drying.

5. The recycling process according to claim 4, wherein, the freeze-drying is performed at −140° C. to −50° C. for 5 min to 15 min.

6. The recycling process according to claim 4, wherein, a rapid cooling agent used for the surface rapid cooling treatment is dry ice.

7. The recycling process according to claim 1, wherein in step (1), the rolling is performed at −80° C. to −50° C.

8. The recycling process according to claim 2, wherein the non-polar solvent is at least one of diethylacetamide, trimethyl phosphate, or triethyl phosphate.

9. The recycling process according to claim 1, wherein in step (3), the roasting is performed at 600° C. to 1000° C. for 30 min to 90 min.

* * * * *